Jan. 16, 1940.  F. H. BULTMAN  2,187,643
TWO-SPEED BICYCLE
Filed July 26, 1937  2 Sheets-Sheet 1
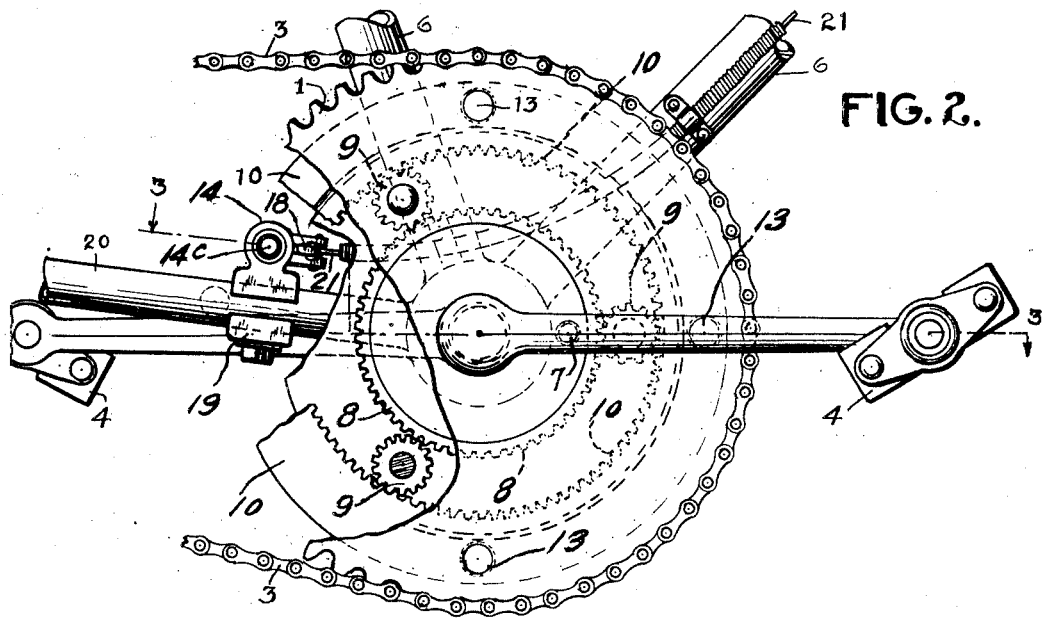
FIG. 2.
FIG. 1.
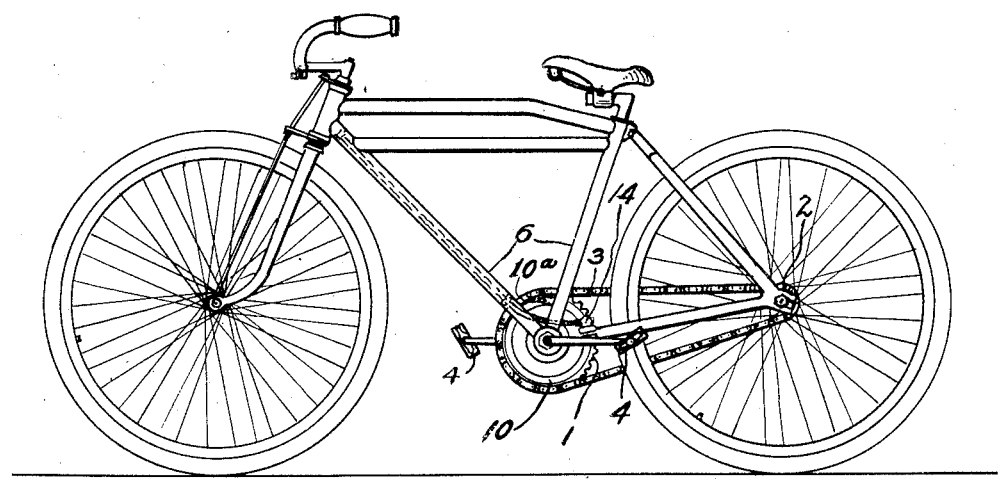
INVENTOR.
FREDERICK HOOKER BULTMAN.
BY Milburn and Milburn
ATTORNEYS Jan. 16, 1940.   F. H. BULTMAN   2,187,643
TWO-SPEED BICYCLE
Filed July 26, 1937   2 Sheets-Sheet 2
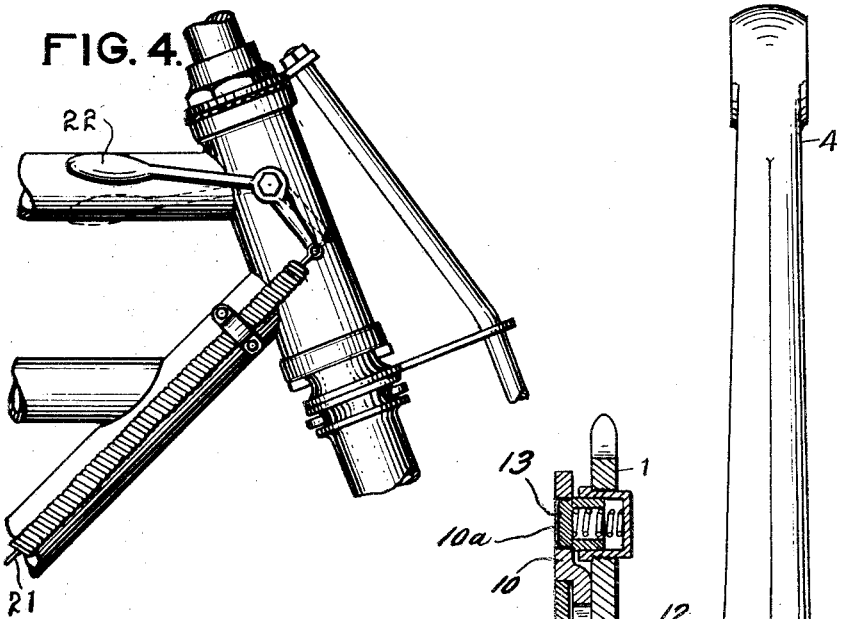
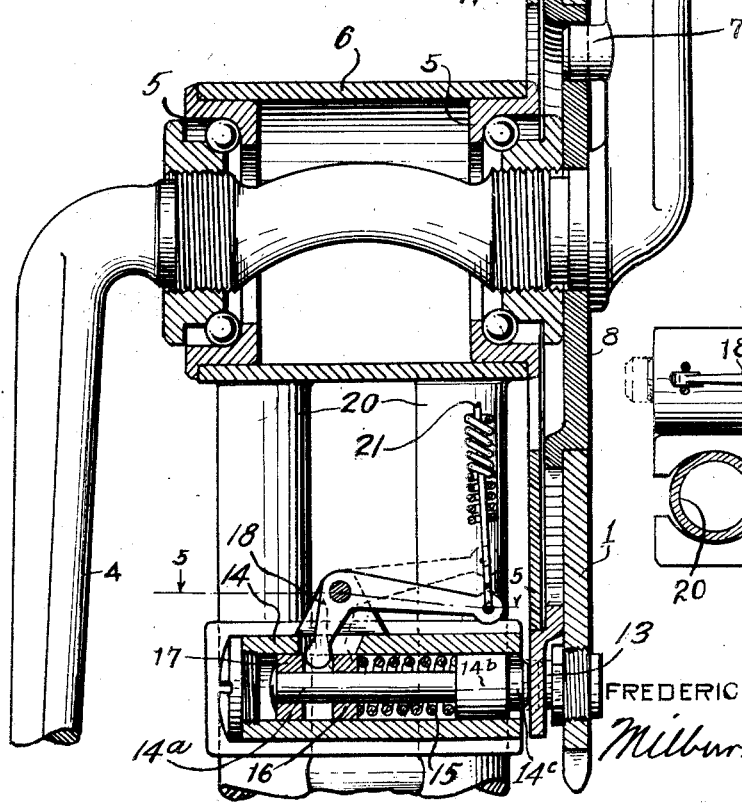
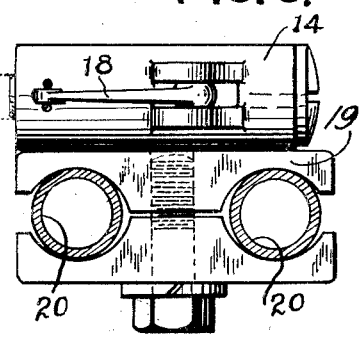
INVENTOR.
FREDERICK HOOKER BULTMAN
Milburn & Milburn
ATTORNEYS.

Patented Jan. 16, 1940

2,187,643

UNITED STATES PATENT OFFICE 2,187,643

TWO-SPEED BICYCLE

Frederick Hooker Bultman, Cleveland, Ohio

Application July 26, 1937, Serial No. 155,754

9 Claims. (Cl. 74—291)

This invention relates to improvements in a two-speed bicycle.

I am aware that there have already been devised bicycles with provision for changing from one speed to another, but in some of them its is necessary to suspend operation in order to effect this change while in others the means adopted for effecting this change is not practical. Furthermore, in some of the prior devices the two-speed mechanism must be embodied as part of the standard equipment and can not readily be installed by the user.

Thus, one object of my invention is to provide a practical form of two-speed device that can be manufactured and sold as a unitary assembly to be readily installed upon the conventional bicycle, this unitary assembly being capable of manufacture and sale at a comparatively low cost.

Another object is to devise an improved means for effecting the change from one speed connection to the other, this mechanism being positive in character and capable of ready manipulation at any time during operation of the bicycle.

A further object is to devise a speed-change mechanism that will not interfere with the other familiar operations of the conventional type of bicycle.

Other objects will appear from the following description and claims when considered together with the accompanying drawings.

Fig. 1 is a side view of a bicycle embodying my device;

Fig. 2 shows the opposite side of the sprocket;

Fig. 3 is a view taken on line 3—3 of Fig. 2;

Fig. 4 is an elevation of the control lever; and

Fig. 5 is a view taken on line 5—5 of Fig. 3.

It is to be understood that the present form of disclosure is merely for purposes of illustration and that there there might be devised various modifications thereof without departing from the present invention as herein set forth and claimed.

As indicated in the drawings, my improved device is applied to the conventional form of bicycle and is shown as having a large drive sprocket 1, a small driven sprocket 2, and a chain connection 3 therebetween, the driven sprocket being operated by the foot pedals 4. The pedal crank is mounted in regular bearings 5 upon the frame 6 of the bicycle, and the pin 7 on one crank engages in a hole in the centrally disposed external gear 8 through which the crank extends for positive driving engagement therewith, as clearly indicated in Fig. 3.

The outer marginal portion of gear 8 is offset and accommodates the sprocket 1 which is thus arranged flush therewith upon the one side thereof. Upon the other side of the sprocket member 1 mount the planetary pinions 9 which are arranged in meshing relation between the external gear 8 and the internal ring gear 10. The ring gear 10 has its internal marginal portion offset and thus accommodates the cover plate 11 which lies flush therewith, this cover plate being riveted to the sprocket member 1, as indicated at 12.

The internal ring gear 10 is adapted to be locked to the sprocket member 1 by means of the spring button or pin 13 carried by the sprocket member and projecting into a corresponding aperture in the gear 10. When thus locked together, these parts will rotate as a unit for conventional drive, but when this lock member is released and the ring member 10 is held stationary, the sprocket 1 continues to rotate and the planetary combination is brought into action so as to effect change in speed, as will appear from the following. Normally, the sprocket member 1 and the internal gear 10 are locked together so as to rotate as a unit and I will now describe the means for freeing the engagement of the pin 13, this means constituting an important part of the present invention.

For this purpose, I have provided a plunger which is enclosed within the barrel 14 and which has its reduced stem 14a surrounded by the coil spring 15. This spring bears at one end against the head 14b of the plunger and at the other end against the movable washer 16 surrounding the plunger. Another washer 17 is affixed to the rear end of the plunger and the one arm of the bell-crank lever 18 extends between the two washers 16 and 17 so as to actuate washer 16 and place the spring under tension preparatory to causing the forward reduced end portion 14c of the plunger to snap through the aperture 10a in ring gear 10 and thereby force the pin or button 13 out of engagement with the ring gear 10. The reduced end portion 14c is of an extent corresponding to the thickness of the ring gear member 10 so as to ensure complete disengagement of the pin 13 from the aperture in the member 10, but without interfering with the operation of the sprocket 1. In the present form of illustration, I have indicated a plurality of pins 13 so as to reduce the time required for reengagement of one of them in the hole 10a in the gear member 10 when returning to high speed, as will be explained below. Any desired number of pins 13 may be employed. The end portion of the plunger fills the aperture in the ring gear, and the pin 13 passes over the same without hindrance during the period when the planetary combination is rendered effective, as above explained.

The lever 18 is pivoted upon the outside of the barrel 14 which has a bracket 19 clamped upon the double bar of the bicycle frame. Lever 18 is manipulated by the bicycle rider through the flexible wire 21 which is connected to the lever 18 and has an operating hand lever 22 located within easy reach of the rider, as indicated in Fig. 4. The friction of the wire 21 within its sheath may be sufficient to hold the same in the position to which adjusted, although any suitable means may be provided for this purpose and the lever 22 may be placed at any point desired.

From the above it will be seen that with the parts in the position indicated in the drawings, the gear 10 and sprocket 1 are locked together in a positive manner, the lever 22 being in withdrawn or idle position so that the spring 15 holds the plunger end 14c in withdrawn position. Under this condition, the entire sprocket assembly operates as a unit and the force applied to the pedals 4 is transmitted directly and without modification through the gear 8, pinions 9, which are held against individual rotation, and thence to the ring gear 10 and the sprocket 1 to which the ring gear is locked. Thus, the planetary combination is of no effect under this set of conditions, and the gear ratio depends entirely upon the relative diameters of the drive and driven sprockets, as in the conventional one-speed form of bicycle. With my device there may be employed an unusually large drive sprocket 1 so as to afford a higher gear ratio than would otherwise be practical.

Then when it is desired to have a lower gear ratio, as for instance upon an up-grade, this can be accomplished by manipulation of the hand lever 22, as above explained. This will cause the spring 15 to be compressed and this potential force is thus placed back of the plunger which will thereby be projected into the aperture 10a in its path in the ring gear 10 as soon as it comes into registry therewith. That is, the plunger, under pressure, will bear against the face of the gear member 10 until the pin 13 comes into its path so as to register therewith, and then the plunger will force the pin 13 out of engagement with the gear 10 so as to discontinue the locked condition between the sprocket and gear member 10. At the same time, the engagement of the plunger in the ring gear 10 will cause the same to be held still. But the sprocket 1 is still permitted to rotate and the drive connection from the pedals is now through the planetary combination including the rotating central gear 8, and the pinions 9. The pinions 9 will roll around the internal gear 10 and will cause rotation of the sprocket 1 by which the pinions are carried. This reduced gear ratio may be changed back to the higher gear ratio for the greater rate of speed at any time desired merely by manipulation of the lever 22 in the reverse direction, and without having to stop the bicycle. Thus the changing of the gear ratio does not interfere with the regular operation of the bicycle; nor does the regular bicycle operation interfere with the changing of the gear ratio as above described.

Furthermore, my mechanism is positive in character, notably the locking pin or pins 13 and the plunger; and this mechanism can be operated with the greatest degree of facility and dependability.

With my present form of design, as herein set forth, the parts can be made up by the stamping process, to a large extent, and thus the cost of manufacture is considerably reduced.

What I claim is:

1. In a two-speed bicycle, a drive sprocket, crank means for operation by the rider, a planetary gear combination providing an operative connection between the crank means and the sprocket said planetary gear combination being located on the sprocket side of the bicycle, and means for connecting the sprocket for direct drive from the crank means or for modified speed drive through the planetary combination, said means including a positive locking means between the sprocket and the planetary gear combination so as to lock them together as a unit, and a single non-rotatable member readily manipulatable during operation of the bicycle for effecting either release or engagement of the said locking means and for holding said planetary combination during released condition of the locking means so as to render the planetary combination either effective or ineffective.

2. In a two-speed bicycle, a drive sprocket, crank means for operation by the rider, a planetary gear combination providing an operative connection between the crank means and the sprocket said planetary gear combination being located in flat, closely adjacent relation to the sprocket, and means for connecting the sprocket for direct drive from the crank means or for modified speed drive through the planetary combination, said means including an interengageable spring pin and aperture for locking the sprocket and planetary gear combination together as a unit, and a single non-rotatable pin-engaging member for effecting either release or engagement of the said locking means and for holding the planetary combination during released condition of the locking means so as to render the planetary combination either effective or ineffective.

3. In a two-speed bicycle, a drive sprocket, crank means for operation by the rider, a planetary gear combination providing an operative connection between the crank means and the sprocket said planetary gear combination being located in flat, closely adjacent relation to the sprocket, and means for connecting the sprocket for direct drive from the crank means or for modified speed drive through the planetary gear combination, said means including a spring-actuated pin on the sprocket itself, the outer ring gear of the planetary combination having an aperture therein into which the pin is adapted to engage for locking the parts together for operation as a unit, and a spring plunger adapted to be projected through said aperture from the opposite side thereof for disengaging said pin therefrom so as to hold said outer ring gear stationary and permit operation of the planetary gear combination in the modification of the speed.

4. In a two-speed bicycle, a drive sprocket, crank means for operation by the rider, a planetary gear combination providing an operative connection between the crank means and the sprocket, and means for connecting the sprocket for direct drive from the crank means or for modified speed drive through the planetary gear combination, said means including a spring-actuated pin extending through the sprocket itself and at substantially right angle thereto, the outer ring gear of the planetary combination having an aperture therein into which said pin is adapted to engage for locking the parts together as a unit, a spring plunger adapted to be projected from the other side thereof and at substantially right angle thereto for disengaging said pin therefrom so as to hold said outer ring gear stationary and permit operation of the planetary gear combination in the modification of speed.

5. In a two-speed bicycle, a drive sprocket, crank means for operation by the rider, a planetary gear combination providing an operative connection between the crank means and the sprocket said planetary gear combination being located on the sprocket side of the bicycle, and means for connecting the sprocket for direct drive from the crank means or for modified speed drive through the planetary gear combination, said means including a spring-actuated pin on the sprocket, and at substantially right angle thereto, the outer ring gear of the planetary combination having an aperture therein into which said pin is adapted to engage for locking the parts together as a unit, and a spring plunger having a reduced end portion adapted to be projected through said aperture to the extent of the thickness of said ring gear from the opposite side thereof and at substantially right angle thereto so as to disengage said pin therefrom and thereby hold said ring gear stationary and permit operation of the planetary combination for modification of the speed.

6. In a two-speed bicycle, a drive sprocket, crank means for operation by the rider, a planetary gear combination providing an operative connection between the crank means and sprocket, said planetary connection comprising a central external gear fixed to the crank means, pinions mounted directly upon said sprocket and closely adjacent thereto, and an outer internal ring gear arranged closely adjacent said sprocket adapted for locking connection to said sprocket for conventional drive from the crank means to the sprocket, and means for releasing the internal gear from the sprocket so as to permit operation of the planetary combination for modification of speed, said locking means comprising a spring-actuated pin carried by said sprocket itself and at substantially right angle thereto and adapted for engagement with said ring gear, and said releasing means comprising a plunger for co-axial alignment with said pin for forcing said pin from engagement with said ring gear, and means readily accessible to the rider at all times for manipulating said plunger.

7. In a two-speed bicycle, a drive sprocket, crank means for operation by the rider, a planetary gear combination providing an operative connection between the crank means and sprocket, said planetary connection comprising a central external gear fixed to the crank means, pinions mounted directly upon said sprocket and closely adjacent thereto, and an outer internal ring gear arranged closely adjacent said sprocket adapted for locking connection to said sprocket for conventional drive from the crank means to the sprocket, and means for releasing the internal gear from the sprocket so as to permit operation of the planetary combination for modification of speed, said locking means comprising a spring-actuated pin carried by said sprocket itself and at substantially right angle thereto and adapted for engagement in an aperture in said ring gear for positively locking the parts together so as to operate as a unit for conventional drive, and said releasing means comprising a plunger mounted upon the frame of the bicycle for registry with said pin for forcing the same out of engagement with the ring gear, and a spring adapted to be compressed for cocking said plunger preparatory to disengagement of said pin, and means readily accessible to the rider at all times for placing said spring under compression or for releasing such compression so as to again permit locking engagement of the pin with the ring gear.

8. In a device of the class described, a speed-modifying mechanism comprising in combination a rotary member adapted to be operated, a rotatable operating means, a planetary gear combination arranged between said operating means and said rotary member, said planetary combination including a central gear affixed to said operating means, pinions carried by said rotary member, and an outer internal ring gear having an aperture, a spring pin on said rotary member for locking angagement with said aperture so as to render the planetary gear combination ineffective, and a plunger on the opposite side of said ring gear for projection through said aperture so as to release the pin therefrom and hold the ring gear stationary and permit operation of the planetary combination for effecting a modification of speed.

9. In a two-speed bicycle, a unitary combination of sprocket and speed-changing mechanism including a central external gear having means for operative engagement by the crank of a conventional bicycle, planetary pinions mounted upon said sprocket and meshing with said central gear, an outer internal ring gear meshing with said pinions and having an aperture therethrough, said sprocket having a spring pin adapted for locking engagement with said aperture for operation of the sprocket in conventional drive, and a plunger adapted to be mounted upon the frame of the bicycle for registry with the aperture from the opposite side thereof so as to force the pin out of engagement therewith and thereby permit operation of the planetary gear combination for the modification of speed, and means for manipulating said plunger, said unitary sprocket and speed-changing mechanism being adapted for ready installation upon the conventional bicycle.

FREDERICK HOOKER BULTMAN.